US006952727B1

(12) United States Patent
Lindner et al.

(10) Patent No.: US 6,952,727 B1
(45) Date of Patent: Oct. 4, 2005

(54) METHOD FOR ADAPTING A COMPUTER-TO-COMPUTER COMMUNICATION PROTOCOL FOR USE IN AN INDUSTRIAL CONTROL SYSTEM

(75) Inventors: David T. Lindner, Nashua, NH (US); Andrew G. Swales, Windham, NH (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/454,566

(22) Filed: Dec. 7, 1999

(51) Int. Cl.[7] ............... G06F 15/173; G05B 19/18; G05B 15/02
(52) U.S. Cl. ............................. 709/224; 700/9
(58) Field of Search ............... 700/9, 79, 19, 700/42, 2, 18, 11, 17; 709/218, 217, 224, 206; 318/638, 561, 610, 565; 375/224

(56) References Cited

U.S. PATENT DOCUMENTS

| | | | | |
|---|---|---|---|---|
| 3,942,158 A | | 3/1976 | Dummermuth | 340/172.5 |
| 4,669,040 A | * | 5/1987 | Pettit et al. | 700/42 |
| 5,530,643 A | | 6/1996 | Hodorowski | 364/191 |
| 5,684,375 A | * | 11/1997 | Chaffee et al. | 318/565 |
| 5,805,442 A | * | 9/1998 | Crater et al. | 700/9 |
| 5,862,391 A | | 1/1999 | Salas et al. | 395/750.01 |
| 5,887,029 A | * | 3/1999 | Husted et al. | 375/224 |
| 5,949,756 A | | 9/1999 | Kienberger et al. | 370/232 |
| 6,327,511 B1 | * | 12/2001 | Naismith et al. | 700/19 |
| 6,424,872 B1 | * | 7/2002 | Glanzer et al. | 700/17 |
| 6,445,962 B1 | * | 9/2002 | Blevins et al. | 700/37 |

FOREIGN PATENT DOCUMENTS

| | | |
|---|---|---|
| EP | 0 903 655 A2 | 3/1999 |
| WO | WO 99/13388 | 3/1999 |

OTHER PUBLICATIONS

Swales, Open MODBUS/TCP Specification, Mar. 29, 1999.*
"Open Modbus/TCP Specification," A. Swales, Schneider Electric, pp. 1–26, Mar. 29, 1999.

* cited by examiner

Primary Examiner—Wen-Tai Lin
Assistant Examiner—Kenny Lin
(74) Attorney, Agent, or Firm—Ware, Fressola, Van Der Sluys & Adolphson LLP

(57) ABSTRACT

A method for adapting a computer-to-computer communication protocol, and especially TCP/IP, or any protocol implemented in a general purpose off-the-shelf network like Ethernet, for use in providing communication needed in an industrial control system, and especially an industrial control system using a programmable logic controller (PLC), where there is frequent communication between the PLC and control or monitoring elements, the method aimed at allowing the PLC to perform scanning of its ladder logic at a rate adequate for effective industrial control. The method includes making permanent-type TCP connections between the PLC and a control element or a monitoring element, use of a protocol for communication with a control or monitoring element in which both a read register and a write register instruction is included in a single communication transaction, such as a MODBUS command, and tuning communication between the PLC and a control element or a monitoring element.

12 Claims, 3 Drawing Sheets

Allow tuning of how long to wait for response to a query from a control or monitoring element, based on how long the element typically takes to respond.

Allow tuning of how often to query a control or monitoring element, based on the importance of having recent status information from the element.

Use a permanent-type network connection to a network I/O device for a control or monitoring element if the element is queried frequently enough.

Allow selecting of either of three Modbus protocols for a communication transaction: read register, write to register, or read and write to register of a network I/O device for a control or monitoring element.

Fig. 4

METHOD FOR ADAPTING A COMPUTER-TO-COMPUTER COMMUNICATION PROTOCOL FOR USE IN AN INDUSTRIAL CONTROL SYSTEM

BACKGROUND OF THE INVENTION

1. Technical Field

The present invention pertains to the field of industrial control automation. More particularly, the present invention pertains to communication over a network between a programmable logic controller (PLC) of an industrial control system and network I/O devices connected to control and monitoring elements of the industrial control system, as well as communication between different PLCs of a distributed industrial control system.

2. Description of Related Art

As indicated in FIG. 1, an industrial control system often includes a programmable logic controller (PLC) for providing coordinated control of industrial control equipment, which includes various elements, that are often either sensors for providing inputs to the PLC or relays for receiving outputs from the PLC, each under the control of an element controller, and each connected to the network via a network I/O device. Industrial control using a PLC requires what is termed rapid scanning, meaning the continuous, rapid execution by the PLC of three main steps executed repeatedly: the acquiring of the status of each input to the PLC needed to execute so-called ladder logic for the process being controlled, the solving of the ladder logic to determine each output, and the updating of the status of the outputs.

The term ladder logic is used to indicate, in a form recognizable to early workers in the field of machine control, the expression of how the control elements of an industrial control system are to be controlled based on the monitoring elements of the industrial control system. The term ladder is used because the expression of the control logic is actually often in the form of a ladder, with each rung of the ladder having an output, i.e. a value for the required state of a control element, and one or more inputs, i.e. values corresponding to signals from monitoring elements. The inputs for an output may be in series, in which case they span a rung of the ladder, or in parallel, in which case the term ladder is not so apt.

For effective industrial control, a PLC must communicate with the monitoring elements of the industrial control system, execute the ladder logic, and provide the outputs to the control elements at a rate that is adequate for effective industrial control. In this scanning (input, solve, output), usually only a small amount of information is passed between a PLC and an element (via the network I/O device for the element and the controller for the element), but communication between the PLC and the element is usually frequent, once each scan. Off-the-shelf networks, such as Ethernet-type networks, have so far been found inadequate; setting up a communication, as would normally be done using such a network, takes too long for industrial control.

But from a cost standpoint, a general purpose off-the-shelf network is almost always preferable compared to a network designed specifically for a particular industrial control application, or even for a network designed for a generic industrial control application. Moreover, a mature general purpose off-the-shelf network should be more reliable than a custom network. Finally, using a general-purpose off-the-shelf network for an industrial control system allows also connecting at the same time computing hardware and software not related to the industrial control system. Using an off-the-shelf general purpose network, such as Ethernet, makes possible a single network strategy for unified communications from device to site level. With Ethernet, even worldwide communications, at least for monitoring, are possible via connection to the Internet.

What is needed is a way to operate a PLC over a general purpose off-the-shelf computer so as to allow scanning, i.e. execution of the three basic steps of a PLC, at a rate adequate for effective industrial control.

SUMMARY OF THE INVENTION

Accordingly, the present invention provides a method for adapting a general purpose query protocol for use by an industrial control system, the industrial control system including a controller for providing control, via a network for communication according to a model compatible with the Open Systems Interconnection (OSI) seven-layer model, over a process through at least one control element and at least one monitoring element, each coupled to the network via a network I/O device, the controller for performing communication with the network I/O devices according to the general purpose query protocol, the method comprising the step of: making a permanent-type connection to the network I/O device for the control element or for the monitoring element based on an analysis of communication transactions between the controller and the control element or the monitoring element; thereby specializing the general purpose query protocol, which would ordinarily be used in computer-to-computer communications for making ad hoc queries of an external device, to use by the industrial control system in performing frequent communication of control and monitoring information between the controller and the control element or the monitoring element of the industrial control system. In one aspect of the present invention, the permanent-type connection is a connection, at a transport layer of the network communication model, that is left open for later use after an earlier use.

In some applications, the method of the present invention further comprises the step of: making available use of a protocol in which a single command from the controller performs both a read register and a write register instruction. In one particular application of the invention, the protocol is compatible with the open MODBUS/TCP protocol.

In addition to the above steps, the method of the present invention can comprise the steps of: rate tuning the controller so as to adjust how often to communicate with the control element or the monitoring element; and also duration tuning the controller so as to adjust how long to wait for the control element or the monitoring element to respond to a query.

BRIEF DESCRIPTION OF THE DRAWINGS

The above and other objects, features and advantages of the invention will become apparent from a consideration of the subsequent detailed description presented in connection with accompanying drawings, in which:

FIG. 4 is a schematic diagram showing the elemental steps that make up the overall method of the present invention for allowing use of an off-the-shelf general purpose network to connect the components of an industrial control system, and to also interconnect different industrial control systems.

BEST MODE FOR CARRYING OUT THE INVENTION

Figure 1:
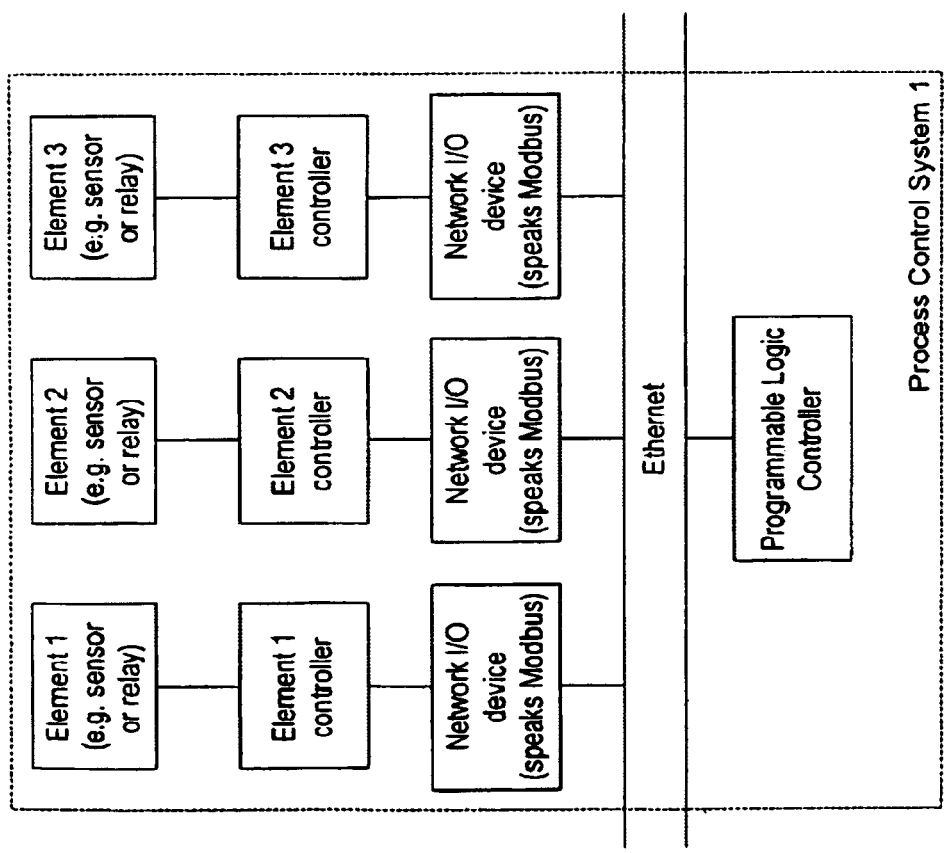
FIG. 1 is a block diagram showing various components of an industrial control system connected via Ethernet, as an example of an off-the-shelf, general purpose network for which the method of the present invention is intended.

Referring now to FIG. 1, an industrial control system is shown implemented so as to rely on a general purpose off-the shelf network, here an Ethernet, and thus implemented in a way for which the method of the present invention is intended, a method by which a general purpose off-the-shelf network is used so as to provide communication between connected devices at a rate adequate for effective industrial control. Ethernet is used here as representing any network over which communication using TCP/IP can be performed, including any of the various kinds of networks that make up the Internet.

Information sent over an Ethernet network is in the form of discrete packets defined according to the seven layer Open Systems Interconnection (OSI) standard for a communication model maintained by the American National Standards Institute (ANSI). OSI is a layered communication model in which the highest layers take advantage of the capabilities of the lower layers to send information between nodes of a network. Information is passed between nodes in the form of discrete packets or frames containing data or control information supplied by the various OSI layers. The highest layers are the Application layer, the Presentation layer, and the Session layer which may include Telnet, File Transfer Protocol (FTP), Simple Mail Transfer Protocol (SNMP), and Domain Name System (DNS).

The Transport layer, a lower-level layer, typically includes the Transmission Control Protocol (TCP) along with the User Datagram Protocol (UDP), among others, and provides for the delivery of the data to a desired device and the division of the information into discrete packets for sending. Received packets are reassembled in a like manner. The Network layer, another lower-level layer, routes messages back and forth between a source node and a destination node according to Internet Protocol (IP) addresses by adding an IP header to each packet indicating the source and destination IP addresses. The lowest layer is the physical link layer in which the hardware media access control (MAC) addresses are used.

The majority of networks operate according to a combination of TCP at the transport layer and IP at the network layer, a combination that is commonly referred to as a TCP/IP. A more complete explanation of the operation of networks according to the TCP/IP protocol suite may be found in COMER, DOUGLAS E., Internetworking With TCP/IP Volume 1: Principles, Protocols, and Architecture, Third Edition, 1995, Prentice-Hall, Englewood Cliffs, N.J.

FIG. 1 shows an industrial control system including a PLC connected over a general purpose off the shelf network to control or monitoring elements, namely, element 1, element 2, and element 3. Each of the control or monitoring elements is under the control of a controller, which is itself connected to the network via a network I/O device.

Each of the control elements is a relay or actuator of one sort or another, and each monitoring elements is a sensor. Each sensor provides at least an input to the PLC. Each relay at least receives a command as an output of the PLC.

Each element controller is shown in FIG. 1 as distinct from the control or monitoring element under its control; but an element controller is often integrated with the element under its control, or integrated with the network I/O device for the element.

In the preferred embodiment, a PLC of an industrial control system uses a control language such as MODBUS for communicating with the control and monitoring elements of the system. In the present invention, preferably, the MODBUS command language is used, but not any corresponding MODBUS network structure, i.e. the term "MODBUS" is here used to refer only to the MODBUS language, i.e. the structure of the messages communicated between components of the industrial control system, and is not used to suggest any particular network protocol or hardware.

Preferably, in using the method of the present invention, any firmware of the network I/O devices should be based on MODBUS TCP/IP, as defined by the Open MODBUS/TCP specification, release 1.0, published on the Internet (at http//www.modicon/openmbus/standards/openmbus.htm) on 29 Mar., 1999, and hereby incorporated by reference. This standard defines how MODBUS commands and responses are delivered over the Internet to and from a MODBUS server using the well known port 502. The firmware of the network I/O devices also preferably supports ICMP (Internet Control Message Protocol) echo requests, such as PING.

MODBUS/TCP is a variant of the MODBUS family of simple, vendor-neutral communication protocols intended for supervision and control of automation equipment. Specifically, it covers the use of MODBUS messaging in an 'Intranet' or 'Internet' environment using the TCP/IP protocols. The most common use of the protocols at this time are for Ethernet attachment of PLC's, I/O modules, and 'gateways' to other simple field buses or I/O networks.

In MODBUS, data transactions are traditionally stateless, making them highly resistant to disruption from noise and yet requiring minimal recovery information to be maintained at either the source or destination of a data transaction. Programming operations, on the other hand, expect a connection-oriented approach, achieved in some variants of MODBUS by an exclusive 'login' token, and on other MODBUS variants by explicit 'Program Path' capabilities for maintaining a duplex association until a connection is explicitly broken down.

MODBUS/TCP handles both situations. A connection is easily recognized at the protocol level, and a single connection may carry multiple independent transactions. In addition, TCP allows a very large number of concurrent connections, so in most cases it is the choice of the initiator whether to reconnect as required or re-use a long-lived (permanent-type) TCP connection.

In addition to supporting ICMP echo requests, the firmware of a network I/O device preferably takes advantage of how the open MODBUS/TCP specification allows use of a iS simplified custom TCP/IP stack. To avoid fragmentation at the IP level, a small TCP window size is, preferably, specified. Each TCP data segment preferably contains exactly one complete MODBUS command response.

Figure 2:
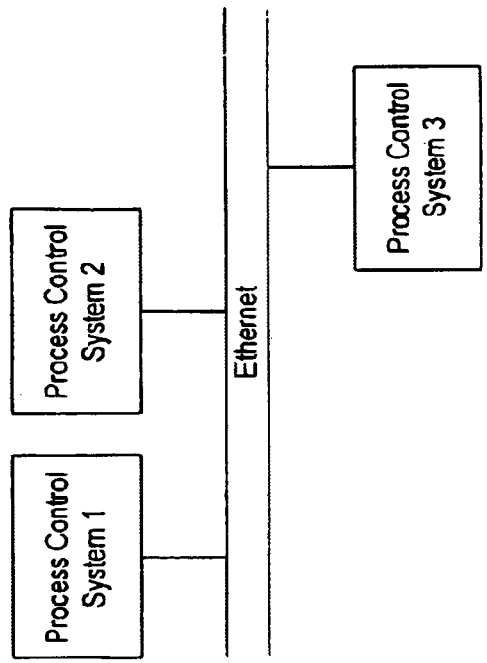
FIG. 2 is a block diagram showing several industrial control systems all interconnected by Ethernet, so as to allow for communication between the PLCs of the different systems.

Referring now to FIG. 2, a distributed industrial control system is shown as including an industrial control system 1, an industrial control system 2 and an industrial control system 3 all connected via Ethernet. In such a system, the PLC of one system communicates with PLCs of each of the other systems. The communication with control or monitoring elements of a particular system is only through the PLC for that particular system.

Figure 3:
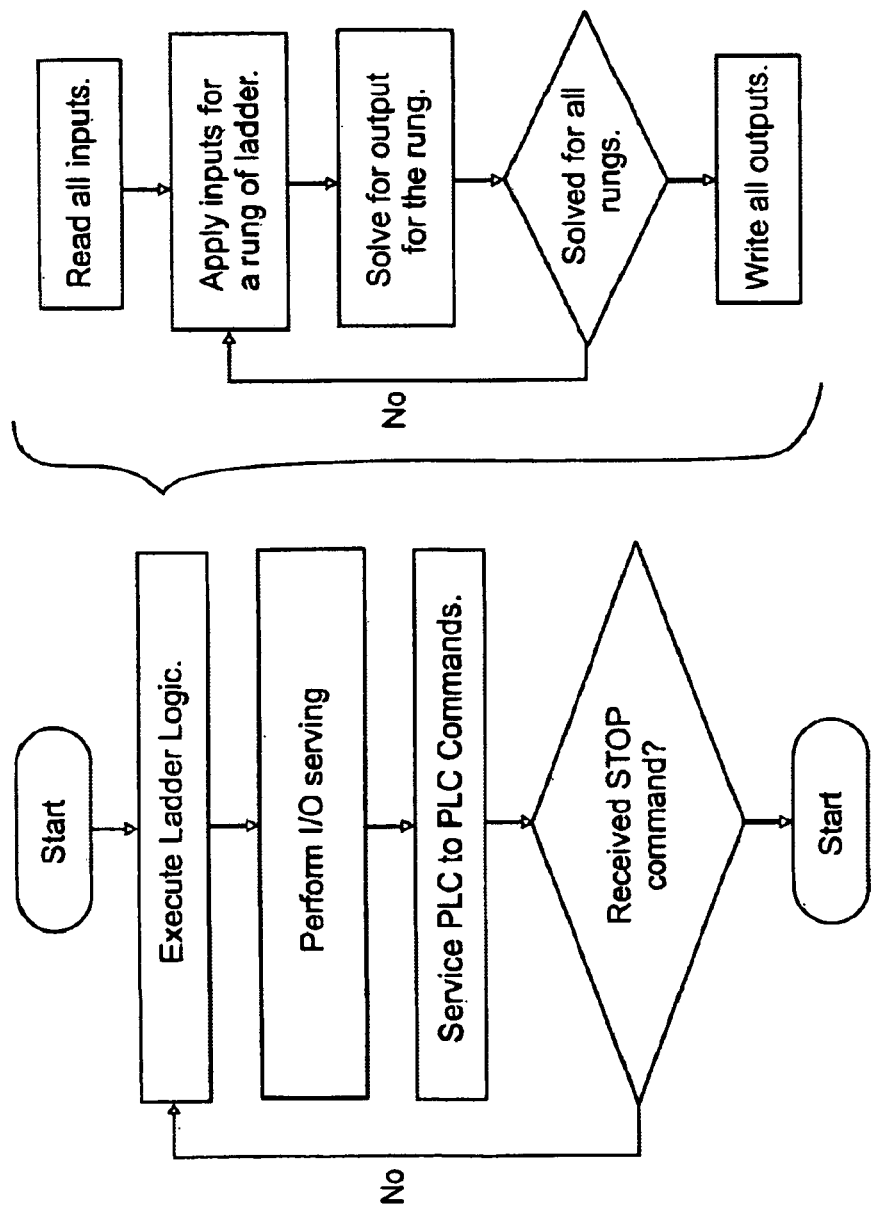
FIG. 3 is a flow chart showing the main steps in the routine operation of a PLC, both according to the present invention as well as the prior art.

Referring now to FIG. 3, the routine operation of a PLC for a particular industrial control system is shown as including first a step in which the so-called ladder logic for the industrial control system is executed. FIG. 3 shows that the ladder logic execution consists of reading all inputs, i.e., obtaining values corresponding to signals provided by each of the monitoring elements of the industrial control system; applying inputs for a rung of the ladder; solving for the outputs of the rung; and repeating this application of inputs to a rung and solving for the output for the rung until the entire ladder is solved; and then providing all outputs, i.e., making available values corresponding to what the required state of each control element should be according to the ladder logic just executed.

Still referring to FIG. 3, after executing the ladder logic, input output servicing is performed, in which the outputs as a result of the executed ladder logic are put into effect (having been merely made available during execution of the ladder logic), and then the inputs for each monitoring element are again acquired.

Next, still referring to FIG. 3, in the case of a distributed industrial control system, a PLC performs whatever communication is programmed between it and each of the other PLCs of the distributed system. This communication typically includes values corresponding to the states of monitoring elements of the different systems. The values reported by monitoring elements of one industrial control system may be used in the ladder logic of another system.

Referring now to FIG. 4, the method of the present invention for using a general purpose off the shelf network to provide the connectivity needed for an industrial control system, including a programmable logic controller and elements as shown in FIGS. 1 and 2, is shown as including, in a preferred embodiment, four steps. A first step is for a user of the industrial control system to tune how long the PLC waits for a response to a query from a network I/O device for a control or monitoring element. Some monitoring and control elements take longer to respond to a query than others. To decrease the time it takes to complete a cycle of its routine operation, the method of the present invention provides for this tuning based on time to respond. By this, instead of waiting a constant amount of time, which would have to be long enough for the slowest element to respond, the PLC is configurd to wait less time for a response to a query in the case of the more rapidly responding elements.

Still referring to FIG. 4, another step in the method of the present invention is to allow a user to tune how often to query a controller and monitoring element, based on the importance of having recent status information from the element. So the PLC may be tuned to communicate with a monitoring element less frequently where the monitoring element monitors aspects of the process that change relatively slowly, compared to a typical period for executing a cycle of operation by the PLC.

Still referring to FIG. 4, another step of the method of the present invention is to arrange (by suitable preprogramming) for the PLC to automatically use a permanent-type TCP connection to a control or monitoring element, based on an analysis of the communications with the control of monitoring element, such as, e.g. whether the device is queried frequently enough to warrant maintaning the connection as a permanent-type connection. A permanent-type TCP connection is simply a TCP connection, between two network I/O devices, that is not closed, at least not immediately, after it is first opened and transactions or data at hand are transmitted from one of the devices to the other. Instead, the connection is left open for later use in communicating between the two devices additional transactions or data.

Thus, if the user tunes the system to query a particular element relatively frequently, the PLC will more likely establish a permanent type TCP connection to the element. Such connections have as a cost some overall slowing of the network communications, but save on the time needed to perform each communication. In the case of Ethernet, establishing a permanent-type TCP connection eliminates three connect packets and three disconnect packets for every MODBUS command/response pair. Usually, a general purpose off-the-shelf network will support only a limited number of permanent-type connections, and a PLC operating according to the present invention will automatically rank order its monitoring and control elements based on how frequently each is queried, so as to take maximum advantage of the limited number of permanent-type connections supported by the network.

Still referring to FIG. 4, the method of the present invention also provides for allowing the user to select either of three protocols for a communication transaction between the PLC of an industrial control system and a control or monitoring element: in one protocol, a MODBUS command would call for a single read of a memory register of a device; in another protocol, a MODBUS command would call for a single write to a memory register of a device; and in a third protocol, a single MODBUS command could call for both a read from a memory register and a write to a memory register.

Then, for a control or monitoring element that allows both reading and writing, the user would select the read/write protocol, and would thus achieve a savings in time to complete a cycle of operation of the PLC. For some control or monitoring elements, information is either only read from a register or written to a register, and so for such elements, the user would select as the MODBUS protocol for a communication transaction either read register or write to register.

For example, in case of a control element to be turned on, according to just executed ladder logic, if the control element confirms receiving a command to turn on, and if the control element supports read/write protocol, the user would have the PLC use the read/write protocol for the element. Then a single command to the control element to turn on (or off) would accomplish what would otherwise require two separate commands.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for use by an industrial control system, the method comprising:

a controller providing control over an industrial process through at least one control element and at least one monitoring element each coupled to the network via a network I/O device, the controller communicating with the network I/O devices according to a layered general purpose query protocol including a transport layer for communication compatible with TCP (Transmission Control Protocol);

performing an analysis of communication transactions related to sensor data and/or control commands between the controller and either the control element or the monitoring element; and the controller making a permanent-type connection to the network I/O device for the control element or for the monitoring element based on the analysis of the communication transactions;

wherein the permanent-type connection is a connection at the transport layer left open for later use after an earlier use; thereby specializing the layered general purpose query protocol, which would ordinarily be used in computer to computer communications for making ad hoc queries of an external device, to use by the industrial control system in performing frequent communications of control and monitoring information between the controller and the control element or the monitoring element of the industrial control system.

2. The method as claimed in claim 1, wherein the general purpose query protocol allows for a single command by which the controller performs both a read register and a write register instruction.

3. The method as claimed in claim 1, wherein at the transport layer of the general purpose query protocol communication occurs according to an open MODBUS/TCP type of protocol.

4. The method as claimed in claim 1, wherein:
the controller is rate-tuned so as to adjust how often to communicate with the control element or the monitoring element; and
the controller is duration-tuned so as to adjust how long to wait for the control element or the monitoring element to respond to a query.

5. The method as claimed in claim 1, wherein the network is an Ethernet-type network.

6. The method as claimed in claim 1, wherein the controller is a programmable logic controller (PLC).

7. A system, comprising:
a controller of an industrial control system;
a control element and/or a monitoring element of the industrial control system;
wherein the controller and the control element or the monitoring element are connected by a network over which communication occurs according to a layered general purpose query protocol including a transport layer for communication compatible with TCP (Transmission Control Protocol); and
means for analyzing communication transactions related to sensor data and/or control commands between the controller and either the control element or the monitoring element;
wherein the controller further comprises means for making a permanent-type connection at the transport layer between the controller and the monitoring element or the control element via a network I/O device coupling the monitoring element or the control element to the network based on the analysis of the communications transactions, wherein the permanent-type connection is a connection at the transport layer left open for later use after an earlier use;
thereby specializing the layered general purpose query protocol, which would ordinarily be used in computer to computer communications for making ad hoc queries of an external device, to use by the industrial control system in performing frequent communications of control and monitoring information between the controller and the control element or the monitoring element of the industrial control system.

8. The system of claim 7, wherein the general purpose query protocol allows for a single command by which the controller performs both a read register and a write register instruction.

9. The system of claim 7, wherein at the transport layer of the general purpose query protocol communication occurs according to an open MODBUS/TCP type of protocol.

10. The system of claim 7, wherein:
the controller is rate-tuned so as to adjust how often to communicate with the control element or the monitoring element; and
the controller in duration-tuned so as to adjust how long to wait for the control element or the monitoring element to respond to a query.

11. The system of claim 7, wherein the network is an Ethernet-type network.

12. The system of claim 7, wherein the controller is a programmable logic controller (PLC).

* * * * *